United States Patent [19]

Hoersten et al.

[11] Patent Number: 4,988,530

[45] Date of Patent: Jan. 29, 1991

[54] SOLUBLE DIETARY FIBER FORTIFIED BEVERAGE

[75] Inventors: Kenneth P. Hoersten, Fremont; Albert D. Bolles, Spring Lake; Duane G. Dougan, Hesperia; Marcia E. Akad, Fremont, all of Mich.

[73] Assignee: Gerber Products Company, Fremont, Mich.

[21] Appl. No.: 496,808

[22] Filed: Mar. 21, 1990

[51] Int. Cl.$^5$ ................................................ A23L 2/02
[52] U.S. Cl. .................................. 426/577; 426/590; 426/599
[58] Field of Search ................ 426/575, 590, 599, 577

[56] References Cited

U.S. PATENT DOCUMENTS

| | | | |
|---|---|---|---|
| 1,977,945 | 10/1934 | Jameson et al. | 99/5 |
| 2,605,188 | 7/1952 | Baker | 99/205 |
| 3,446,625 | 5/1969 | Blethen | 99/105 |
| 3,826,829 | 7/1974 | Marulich | 426/190 |
| 3,922,371 | 11/1975 | Julien | 426/565 |
| 4,009,289 | 2/1977 | Roos | 426/330.3 |
| 4,180,595 | 12/1979 | Lauredan | 426/575 |
| 4,198,400 | 4/1980 | Biegler | 424/180 |
| 4,266,472 | 5/1981 | Reale | 99/483 |
| 4,281,026 | 7/1981 | Reale | 426/231 |
| 4,293,580 | 10/1981 | Rubenstein | 426/565 |
| 4,388,330 | 6/1983 | Wobben | 426/330.5 |
| 4,433,000 | 2/1984 | De Leon | 426/330.5 |
| 4,529,613 | 7/1985 | Mezzino et al. | 426/590 |
| 4,689,235 | 8/1987 | Barnes | 426/103 |
| 4,690,827 | 9/1987 | Kupper et al. | 426/548 |
| 4,790,991 | 12/1988 | Shaw | 426/74 |
| 4,818,539 | 4/1989 | Shaw | 426/74 |
| 4,834,990 | 3/1989 | Amer | 426/74 |
| 4,851,392 | 7/1989 | Shaw | 426/658 |

OTHER PUBLICATIONS

Marketing Intelligence Service, "New Products," 3-1-9-90, Item 72.

Andon, "Applications of Soluble Dietary Fiber," *Food Technology*, 41(1), 74–75, 1987.

Schneeman, "Dietary Fiber: Physical and Chemical Properties, Methods of Analysis and Physiological Effects," *Food Technology*, (40) (2), 104–110, 1986.

Gormley, "Dietary Fibre—Some Properties of Alcohol-Insoluble Solids Residues from Apples," *J. Sci. Food*, 32, 192–198, 1981.

Schneeman, "Soluble vs. Insoluble Fiber–Different Physiological Responses," *Food Technology*, Feb. 1987, 81–82.

Holloway et al., "Pectin Digestion in Humans," *The American Journal of Clinical Nutrition*, Feb. 1983, 253–255.

*Primary Examiner*—Carolyn Paden
*Attorney, Agent, or Firm*—Price, Heneveld, Cooper, DeWitt & Litton

[57] ABSTRACT

Beverages including a liquid carrier and a combination of gum arabic and pectin having a degree of esterification of at least 50%, at a level to provide at least 2 grams of fiber per 8 fluid ounce serving.

28 Claims, No Drawings

SOLUBLE DIETARY FIBER FORTIFIED BEVERAGE

BACKGROUND OF THE INVENTION

This invention relates to beverages. Artisans have suggested the addition of soluble dietary fiber to beverages as an enrichment additive or as a thickener replacement.

The growing awareness of the affect of lifestyle and diet on overall health has caused a significant rethinking of attitudes toward dietary habits. Current studies indicate that dietary fibers help promote good health and otherwise appear to have a beneficial affect on weight control, cholesterol levels, diabetes and in the prevention of cardiovascular disease, diverticulitis, varicose veins, hiatus of the hernia and colon cancer. The Food and Drug Administration in the United States has indicated that a person should consume 25 to 30 grams of dietary fiber per day, with a fair source of fiber containing at least 2 grams per serving and an excellent source containing 8 grams per serving. The current average dietary fiber consumed in the United States is 11 to 15 grams per day. Given the high usage of refined food products, such as cereal grain, in which the dietary fiber has been deliberately removed from the refined food product, there is a particular need for food products which can provide a convenient and tasteful source of dietary fiber.

Dietary fiber is defined as plant material resistant to hydrolysis by enzymes of the mammalian digestive tract. There are two general categories of dietary fiber, soluble and insoluble, with different physical properties and different benefits, although the presence of either or both in the diet beneficially affects health. However, the insoluble fibers (cellulose, hemicelluloses and lignin) do not provide many of the health benefits that the soluble types offer. For example, bran, the most widely recognized fiber, has no beneficial effect on cholesterol levels while soluble dietary fibers have been demonstrated to be effective in reducing serum cholesterol levels in humans. In addition, when incorporated into liquid food formulations, the insoluble dietary fibers are difficult to maintain in proper suspension or dispersion, and tend to settle to the bottom of drinks and beverages. Additionally, the insoluble dietary fibers provide the liquid foodstuffs with a gritty texture and are not particularly pleasant tasting.

Because of their solubility, the soluble dietary fibers do not have a gritty texture associated with their use. However, the soluble fibers tend to thicken liquid products and can affect the original sensory mouthfeel of the unmodified liquid. Thus, dietary supplements such as carboxymethyl cellulose have to be added to water or juice and consumed promptly, or they will thicken the solution to the consistency of partially set gelatin or wallpaper paste. Psyllium powder which has some soluble dietary fiber does not thicken as much as carboxymethyl cellulose, but has a gritty or grainy mouthfeel and an unattractive, dirty appearance.

It is known that gum arabic does not affect the viscosity to the degree of soluble fibers such as carboxymethyl cellulose or psyllium powder. However, to form a liquid product with a dietary fiber level of practical significance, gum arabic must be used at concentration levels which would exceed current allowable Food and Drug Administration limits on gum arabic, and which would be so high that they might not be approved by that agency for human consumption.

SUMMARY OF THE INVENTION

We have surprisingly discovered that a relatively low viscosity dietary fiber beverage product can be commercially produced by the addition of a particular combination of gum arabic and certain pectin soluble fibers to fruit and vegetable beverages. As used herein, the term "beverages" includes fruit-flavored drinks, fruit and vegetable juice drinks and fruit and vegetable juices. The beverage products of this invention contain from 1.0 to 4.0 weight percent of gum arabic and from 0.2 to 1.2 weight percent of high methoxyl pectin and provide a fiber content of at least 2 grams fiber per 8 ounce serving. The incorporation of gum arabic and high methoxyl pectin does not significantly alter the smooth mouthfeel of the beverage (i.e., does not result in a grainy, particulate or lumpy mouthfeel). It does make the beverage feel more full bodied in the mouth. The beverage of this invention with added fiber is somewhat more viscous than it would be without the fiber, but does not become gelatinous and pasty like a solution of carboxymethyl cellulose or have a gritty, grainy mouthfeel like psyllium powder in water. In addition to having little impact on beverage viscosity and smooth mouthfeel, the addition of the soluble fibers in accordance with the invention surprisingly reduces the tartness of acidic juices included in the beverage.

DESCRIPTION OF THE PREFERRED EMBODIMENT

In a preferred embodiment of the invention, there are provided fruit and vegetable beverages comprising high methoxyl pectin and gum arabic blended into fruit and vegetable juices or drinks.

More particularly, the present invention provides liquid compositions comprising a liquid carrier, fruit juices or concentrates, vegetable juices or concentrates, or fruit flavors and a soluble dietary fiber supplement consisting essentially of gum arabic and a pectin having a degree of esterification of at least 50%, wherein the amount of gum arabic is in the range from 1 to 4 weight percent and the amount of pectin is in the range from 0.2 to 1.2 weight percent, said weight percents being based on total weight of product, and wherein the amount of fiber supplement is sufficient to provide a fiber level of at least 2 grams per 8 fluid ounce product.

Pectin is a general term which refers to a variety of polymers composed mainly of (1–4) alpha-D-galacturonic acid units that are found in the lamella of plant cells. One difference between varieties of pectins is their degree of methyl esterification, which decreases somewhat as plant ripening takes place. Protopectin is the form of pectin found in the flesh of immature fruits and vegetables. It is highly esterified with methanol, is insoluble in water, and produces the hard texture of unripe fruits and vegetables. Pectinic acids are less highly methylated forms of pectin and are derived from protopectin by the action of pectic enzymes. Depending on the degree of esterification and degree of methylation, pectinic acids may be colloidal or water soluble.

Pectin used in the juice compositions of the present invention is not being used as a thickening agent. Rather, the high-methoxyl pectins utilized in the liquid beverage foodstuff products of the present invention have a degree of esterification greater than 50%, and preferably greater than 70%, and are employed under conditions of concentration, soluble solids level and pH that do not induce gelation.

A second essential ingredient of the present invention is gum arabic. It is obtained as an exudate from the acacia tree and is ofttimes referred to as acacia gum. Gum arabic is a complex heteroglycen with a molecular weight of 250,000 to 1,000,000 daltons. The polymer usually contains some minor amounts of L-arabinose and L-rhamnose. Molecules exist as short, stiff spirals of 1,050 to 2,400 angstroms in length, depending on molecular charge. Gum arabic dissolves readily in water to produce solutions of low viscosity. Gum arabic can be dissolved and extended to 50% weight to form a high-solid gel similar to that of starch. Concentrations less than 40% in solutions exhibit Newtonian rheology; above 40% concentration the dispersions are pseudoplastic. High quality types of this gum form colorless, tasteless solutions.

The pectin and gum arabic are blended with the beverage composition to provide a liquid composition containing from 0.2 to 1.2, preferably 0.25 to 0.75, and most preferably 0.3 to 0.5 percent by weight of pectin and from 1 to 4, preferably 1.0 to 3 and most preferably 1.0 to 1.9 weight percent gum arabic. The liquid beverages which are prepared in accordance with the present invention contain from 2 to 10 grams, preferably from 3 to 9 grams and most preferably from 5 to 9 grams fiber per 8 fluid ounce serving of the liquid food.

The juices employed in this invention are obtained from a fruit, vegetable or related edible plant by crushing, squeezing and the like operations, then filtered, strained or passed through a sieve, resin bed, clay or diatomaceous earth bed or filters to give the desired juice mixture. The juice comprises at least one type of fruit or vegetable juice, although a combination of various juices as well as types can be utilized. As used herein, the term "fruit or vegetable juice," is meant to include any type of juice o which can be extracted from a fruit or vegetable by any conventional means such as pressing. Representative juices which can be utilized in the present invention include, without limitation thereto, lemon, lime, grapefruit, orange, tomato, pineapple, apple, grape, cranberry, peach, pear, cherry, legumes, celery, carrot and the like.

The beverages of this invention include fruit-flavored drinks, fruit or vegetable juice drinks and fruit or vegetable juices. The beverage mixtures of this invention will contain, in the case of fruit-flavored drinks, from 0.1 to 1% of at least one natural or artificial flavoring, pectin and gum arabic as specified above, with the balance comprising mainly water and additive amounts of other beverage materials such as citric acid, sodium citrate, natural or artificial sweeteners, vitamin extracts and suitable coloring agents such as orange coloring, cherry coloring, grape coloring and the like. Vegetable and fruit juice drinks will contain from 0.1 to 1% of at least one natural or artificial flavoring in admixture with sufficient full strength juice or an equivalent amount of juice concentrate and required water of reconsitution to provide a drink having the desired natural flavor. Generally the amount of full strength juice is less than 100% of the beverage liquid and is usually in the range from 5 to 65, preferably 10 to 45% by weight of total composition. Juice concentrates can be used entirely, as can mixtures of full strength juices to provide the amount of juice necessary to obtain the desired taste. In addition to flavoring, full strength juice, juice concentrate and water of reconsitution, the fruit and vegetable juice drinks will contain pectin and gum arabic as specified above with the balance comprising water and additive amounts of other beverage materials as set forth above. The fruit and vegetable juices comprise full strength juice, juice concentrate with water of reconsitution, or mixtures thereof, pectin and gum arabic as specified above, and additive amounts of other beverage ingredients, such as vitamin extracts. The fruit and vegetable juices are substantially full strength juice mixtures and, except for water of reconsitution for dilution of juice concentrates, otherwise contain no added water. Generally, the finished fruit beverage will have a brix value of at least 10, and preferably in the range of 13 to 15 after all the ingredients have been intermixed. The brix value is generally an indication of sweetness and is defined as the percent of soluble solids primarily made up of natural sugars.

In forming the beverages of this invention, it is preferable that there be used a vessel which has provisions for mixing under high shear. Preferably, from 10 to 20% of the beverage liquid is added to the high shear mixing tank. This liquid portion is heated to 185° F. (80 to 85. C.). Higher temperatures may be used, but they should not exceed the boiling point of the system. Gum arabic and pectin are added and blended into the liquid mixture. This is then charged to a low shear mixer, e.g., batch tank, along with the balance of the liquid, and blended. The mix may then be refrigerated to await packaging or packaged directly. Before packaging, the mix is heated to commercial sterilization or pasteurization temperatures and subsequently packaged according to hot fill technology or cooled and packaged aseptically or in nonsterile containers for refrigerated distribution.

The following Examples 1–12 illustrate satisfactory beverages which have been prepared according to the present invention. In all cases, the liquid beverages have approximately 1 to 2 percent by weight fiber and a fiber content of about 3 to 5 grams per 8 ounce serving. All amounts are parts by weight (PBW), per 100 parts by weight of composition unless otherwise indicated.

EXAMPLE 1

Apple Raspberry Juice with Fiber—Formula A

| Ingredients | PBW |
|---|---|
| Apple Juice, fresh | 89.857 |
| Water | 6.573 |
| Raspberry Juice Conc., Red, 68° Brix | 1.214 |
| Gum Arabic | 1.851 |
| Pectin, high methoxyl | 0.440 |
| Vitamin C | 0.065 |
| | 100.000 |

The finished juice had a viscosity of 33.5 cps at 23.3° C., spindle No. 1 at 100 rpm, Brookfield Model RVT.

EXAMPLE 2

Apple Raspberry Juice with Fiber—Formula D

| Ingredients | PBW |
|---|---|
| Apple Juice, fresh | 90.692 |
| Water | 6.635 |
| Raspberry Juice Conc., Red, 68° Brix | 1.225 |
| Gum Arabic | 1.049 |
| Pectin, high methoxyl | 0.333 |
| Vitamin C | 0.066 |

The finished juice had viscosities of 28.0 cps at 20.6° C. and 40.0 cps at 6.7° C., spindle No. 1 at 100 rpm, Brookfield Model RVT.

EXAMPLE 3

Apple Grape Juice with Fiber—Formula D

| Ingredients | PBW |
|---|---|
| Apple Juice, fresh | 88.534 |
| Water | 7.671 |
| Grape Juice Conc., Concord, 68° Brix | 1.198 |
| Grape Juice Conc., Calif. Red, 68° Brix | 1.152 |
| Gum Arabic | 1.047 |
| Pectin, high methoxyl | 0.332 |
| Vitamin C | 0.066 |
| | 100.000 |

The finished product had viscosities of 39.0 cps at 6.7° C. and 27.75 cps at 20.6° c., spindle No. 1 at 100 rpm, Brookfield Model RVT.

EXAMPLE 4

Apple Grape Juice with Fiber—Formula A

| Ingredients | PBW |
|---|---|
| Apple Juice, fresh | 87.720 |
| Water | 7.600 |
| Grape Juice Conc., Concord, 68° Brix | 1.187 |
| Grape Juice Conc., Calif. Red, 68° Brix | 1.142 |
| Gum Arabic | 1.847 |
| Pectin, high methoxyl | 0.439 |
| Vitamin C | 0.065 |
| | 100.000 |

The finished product had a viscosity of 38.0 cps at 23.3° C., spindle No. 1 at 100 rpm, Brookfield Model RVT.

EXAMPLE 5

Apple Cherry Juice with Fiber—Formula D

| Ingredients | PBW |
|---|---|
| Apple Juice, fresh | 81.251 |
| Water | 13.732 |
| Cherry Juice Conc., Montmorency, 59° Brix | 2.749 |
| Cherry Juice Conc., Dark Sour, 66° Brix | 0.820 |
| Gum Arabic | 1.049 |
| Pectin, high methoxyl | 0.333 |
| Vitamin C | 0.066 |
| | 100.000 |

The finished product had viscosities of 47.75 cps at 6.7° C. and 33.25 cps at 20.6° C., spindle No. 1 at 100 rpm, Brookfield Model RVT.

EXAMPLE 6

Apple Cherry Juice with Fiber—Formula A

| Ingredients | PBW |
|---|---|
| Apple Juice, fresh | 80.505 |
| Water | 13.606 |
| Cherry Juice Conc., Montmorency, 59° Brix | 2.723 |
| Cherry Juice Conc., Dark Sour, 66° Brix | 0.813 |
| Gum Arabic | 1.849 |
| Pectin, high methoxyl | 0.439 |
| Vitamin C | 0.065 |
| | 100.000 |

The finished product had a viscosity of 32.5 cps at 23.3° C., spindle No. 1 at 100 rpm, Brookfield Model RVT.

EXAMPLE 7

Apple Juice with Fiber—Formula D

| Ingredients | PBW |
|---|---|
| Apple Juice, fresh | 98.552 |
| Gum Arabic | 1.049 |
| Pectin, high methoxyl | 0.333 |
| Vitamin C | 0.066 |
| | 100.000 |

The finished product had viscosities of 40.0 cps at 6.7° C., and 27.25 cps at 20.6° C., spindle No. 1 at 100 rpm, Brookfield Model RVT.

EXAMPLE 8

Apple Juice with Fiber—Formula A

| Ingredients | PBW |
|---|---|
| Apple Juice, fresh | 97.645 |
| Gum Arabic | 1.850 |
| Pectin, high methoxyl | 0.440 |
| Vitamin C | 0.065 |
| | 100.000 |

The finished product had a viscosity of 34.75 cps at 23.3° C., spindle No. 1 at 100 rpm, Brookfield Model RVT.

EXAMPLE 9

Orange Juice Drink with Fiber

| Ingredients | PBW |
|---|---|
| Orange Juice Conc., Florida, 64° Brix | 1.729 |
| Sugar | 10.120 |
| Citric acid | 0.138 |
| Sodium citrate | 0.095 |
| Orange flavor, liquid | 0.132 |
| Vitamin C | 0.075 |
| Gum Arabic, spray dried | 0.977 |
| Pectin, high methoxyl | 0.310 |
| Water | 86.424 |
| | 100.000 |

EXAMPLE 10

Apple Cherry Juice Drink with Fiber

| Ingredients | PBW |
|---|---|
| Apple Juice Conc., 70° Brix | 1.206 |
| Cherry Juice Conc., Montmorency, 59° Brix | 0.390 |
| Sugar | 10.112 |
| Citric Acid | 0.132 |
| Sodium citrate | 0.095 |
| Cherry flavor, liquid | 0.230 |

-continued

| Ingredients | PBW |
|---|---|
| Vitamin C | 0.075 |
| Gum Arabic, spray dried | 0.977 |
| Pectin, high methoxyl | 0.310 |
| Water | 86.473 |
| | 100.000 |

EXAMPLE 11

Tomato Vegetable Juice with Fiber

| Ingredients | PBW |
|---|---|
| Tomato paste (hot break 31% NTSS) | 16.215 |
| Vegetable Juice Blend* | 6.900 |
| Salt | 0.276 |
| Vitamin C | 0.067 |
| Citric Acid | 0.063 |
| Pectin, apple, high methoxyl | 0.338 |
| Acacia (gum arabic), spray dried | 1.066 |
| Water | 75.075 |
| | 100.000 |

EXAMPLE 12

Tomato Vegetable Juice with Fiber

| Ingredients | PBW |
|---|---|
| Tomato paste (hot break 31% NTSS) | 16.215 |
| Vegetable Juice Blend* | 6.642 |
| Salt | 0.276 |
| Vitamin C | 0.067 |
| Citric Acid | 0.063 |
| Pectin, apple, high methoxyl | 0.338 |
| Acacia (gum arabic), spray dried | 1.066 |
| Water | 75.333 |
| | 100.000 |

EXAMPLE 13

Single-strength apple juice and single-strength apple cherry juice were compounded with different levels of gum arabic and pectin combinations in accordance with the invention, for sensory testing purposes. Uncompounded juices were employed as controls for the test. Formulation 12-1 was single-strength apple juice with no added dietary fiber; formulation 12-2 was single-strength apple juice combining 1.049 weight percent gum arabic and 0.333 weight percent high methoxyl pectin; formulation 12-3 was single-strength apple juice containing 4.0 weight percent gum arabic and 0.2 weight percent high methoxyl pectin; formulation 12-4 was single-strength apple juice containing 1.0 weight percent gum arabic and 1.2 weight percent pectin; formulation 12-5 was single-strength apple cherry juice containing no dietary fiber; and formulation 12-6 was single-strength apple cherry juice containing 1.049 weight percent gum arabic and 0.333 weight percent high methoxyl pectin. Viscosities were measured of each of the six formulations, using a Brookfield Model RVT viscometer at 100 rpm. All viscosities were measured at 22.8° C. The viscosity results are as follows:

| Formulation | Fiber Content Gum Arabic | Pectin, High Methoxyl | PBW Total | TDF* | Viscosity cps @ 22.8° C. |
|---|---|---|---|---|---|
| 12-1 | 0.00 | 0.000 | 0.00 | 0.0 | 13.0 |
| 12-2 | 1.049 | 0.333 | 1.382 | 3.1 | 27.25 |
| 12-3 | 4.0 | 0.2 | 4.2 | 9.5 | 26.50 |
| 12-4 | 1.0 | 1.2 | 2.2 | 5.0 | 138.0 |
| 12-5 | 0.00 | 0.00 | 0.000 | 0.0 | 13.75 |
| 12-6 | 1.049 | 0.333 | 1.382 | 3.1 | 24.50 |

*Total dietary fiber, g/8 fluid ounces

The juices, and samples of noninvention blends as described in Example 14, were evaluated by a taste panel trained in Quantitative Descriptive Analysis ®. The panel concentrated on the characteristics of flavor and mouthfeel/texture during the language development and data collection phases of the evaluation. Language development consisted of four one hour panel sessions.

During the data collection phase, the product blends were presented in a balanced order with four replications by each panelist. Each panelist rated the product attributes on a six inch line scale divided into 60 equal intervals with the magnitude of the attribute increasing from left to right.

Attributes for flavor consisted of overall flavor, apple, cider, fruity (nonapple), citrus, sweet, tart, musty, artificial fruit, clove, metallic and bitter flavors. Attributes for mouthfeel/texture consisted of amount and size of particles, thickness and mouth coating of the beverage.

The results indicate that, with respect to the major attributes relating to the claims of the invention, such as thickness, graininess and tartness, blends of this invention were found to have less of the undesirable attributes.

With respect to tartness, on a scale of weak to strong, the intensity of tart, sour flavor was reduced from that of unmodified juices.

With respect to size of particles/graininess, on a scale of small to large, the beverages of this invention were judged to not be either grainy or tapioca-like, i.e., they have a smooth mouthfeel.

Thickness was also judged to be low when compared with blends of other dietary fiber sources, as in Example 14.

EXAMPLE 14

Various commercially available dietary fiber sources, including carboxymethyl cellulose, Citrocel ®, Metamucil ®, guar gum, xanthan gum and psyllium mucilloid were compounded according to label instructions into the same apple base. All mixtures were made in single strength apple juice. Viscosity measurements were made immediately after mixing of the compounded products and after 30 minutes standing at room temperature, using Brookfield Model RVT viscometer at 100 rpm, utilizing a 500 ml sample in a 600 ml beaker. The results were as follows:

| | FIBER | | VISCOSITY | | |
|---|---|---|---|---|---|
| | Concentration | TDF* | cps/°C. | | |
| Source | wt % | g/8 oz. | t = 0 min. | t = 30 min. | COMMENTS |
| Carboxymethyl | 1.38 | 3 | 1010/20.6 | 1810/21.1 | Very thick; short and stringy |

-continued

| FIBER | | | VISCOSITY | | |
|---|---|---|---|---|---|
| | Concentration | TDF* | cps/°C. | | |
| Source | wt % | g/8 oz. | t = 0 min. | t = 30 min. | COMMENTS |
| cellulose | | | | | consistency. |
| Citrocel* | 2.29 | 2 | 59.5/21.1 | 98/22.2 | Short, stringy consistency like wallpaper paste. |
| Citrocel | 3.44 | 3 | 298/20.6 | 344/22.2 | Thick, stringy consistency. |
| Metamucil* | 1.54 | 2.7 | 12/21.1 | 33/21.1 | Gritty, flocculent and dark specks. |
| Metamucil | 1.71 | 3 | 19/21.1 | 34.5/21.1 | Gritty, flocculent and dark specks. |
| Guar gum | 1.38 | 3 | 322/22.8 | 1820/22.8 | Very thick, earthy odor and flavor. |
| Xanthum gum | 1.38 | 3 | 1420/22.2 | 1550/22.2 | Thick; short, stringy consistency. |
| Psyllium mucilloid | 1.56 | 3 | 24.5/22.2 | 126/22.2 | Dark specks, flocculent. |

*Formulated according to label instructions.

These data illustrate the drawbacks of the formulations of this example, all noninvention blends, as composed with formulations 12-2, 12-3, 12-4 and 12-6, all of which are blends of this invention, of preceding Example 13. When mixtures were made with these sources at levels providing dietary fiber levels comparable to those of this invention, the resultant blend displayed high viscosity, gelatinous/stringy consistency, grainy/gritty texture, specks, and/or flocculation.

For example, the Metamucil-containing formulations of this example demonstrate a viscosity which would otherwise appear acceptable, but the blend is grainy/gritty with flocculation and dark specks.

The embodiments of the invention in which an exclusive property or privilege is claimed are defined as follows.

1. A beverage comprising a liquid carrier, and a soluble dietary fiber supplement consisting essentially of gum arabic and a pectin having a degree of esterification of at least 50%, wherein the amount of gum arabic is in the range from 1 to 4 weight percent and the amount of pectin is in the range from 0.2 to 1.2 weight percent, said weight percents being based on total weight of beverage, and wherein the amount of fiber supplement is sufficient to provide a fiber level of at least 2 grams per 8 fluid ounce beverage.

2. A beverage in accordance with claim 1 wherein said pectin has a degree of esterification of at least 70%.

3. A beverage in accordance with claim 1 having a fiber content of at least 3 grams per 8 fluid ounce beverage.

4. A beverage in accordance with claim 3 having a fiber content of at least 3 to 10 grams per 8 fluid ounce beverage.

5. A beverage in accordance with claim 1 wherein the amount of gum arabic is in the range from 1.0 to 3.0 weight percent and the amount of pectin is in the range from 0.25 to 0.75 weight percent.

6. A beverage in accordance with claim 5 wherein the amount of gum arabic is in the range from 1.0 to 1.9 weight percent and the amount of pectin is in the range from 0.3 to 0.5 weight percent.

7. A beverage in accordance with claim 1 wherein said liquid carrier comprises apple juice.

8. A beverage in accordance with claim 1 wherein said liquid carrier comprises orange juice.

9. A beverage in accordance with claim 1 wherein said liquid carrier comprises a mixture of apple and cherry juices.

10. A beverage in accordance with claim 1 wherein said liquid carrier comprises tomato juice.

11. A beverage in accordance with claim 1 wherein said liquid carrier comprises water and said beverage contains from 0.1 to 1.0 weight percent of at least one natural or artificial fruit-flavoring.

12. A beverage in accordance with claim 11 having a fiber content of at least 3 grams per 8 fluid ounce beverage.

13. A beverage in accordance with claim 12 having a fiber content of at least 3 to 10 grams per 8 fluid ounce beverage.

14. A beverage in accordance with claim 11 wherein the amount of gum arabic is in the range from 1.0 to 3.0 weight percent and the amount of pectin is in the range from 0.25 to 0.75 weight percent.

15. A beverage in accordance with claim 14 wherein the amount of gum arabic is in the range from 1.0 to 1.9 weight percent and the amount of pectin is in the range from 0.3 to 0.5 weight percent.

16. A beverage in accordance with claim 1 wherein said carrier liquid comprises water and said beverage contains a flavor component selected from the group consisting of fruit juice, fruit juice concentrate, vegetable juice, or vegetable juice concentrate, and mixtures thereof.

17. A beverage in accordance with claim 16 wherein said pectin has a degree of esterification of at least 70%.

18. A beverage in accordance with claim 16 wherein the amount of flavor component is sufficient to provide the equivalent of 5 to 65 weight percent full strength juice.

19. A beverage in accordance with claim 18 wherein said beverage contains from 0.1 to 1.0 weight percent of at least one natural or artificial fruit or vegetable flavoring.

20. A beverage in accordance with claim 18 having a fiber content of at least 3 grams per 8 fluid ounce beverage.

21. A beverage in accordance with claim 20 having a fiber content in the range from 3 to 10 grams per 8 fluid ounce serving.

22. A beverage in accordance with claim 16 wherein the amount of gum arabic is in the range from 1.0 to 3.0 weight percent and the amount of pectin is in the range from 0.25 to 0.75 weight percent.

23. A beverage in accordance with claim 16 wherein the amount of gum arabic is in the range from 1.0 to 1.9 weight percent and the amount of pectin is in the range from 0.3 to 0.5 weight percent.

24. A beverage in accordance with claim 16 wherein said beverage comprises an orange juice drink.

25. A beverage in accordance with claim 16 wherein said beverage comprises an apple cherry juice drink.

26. A beverage in accordance with claim 1 wherein said liquid carrier comprises at least one fruit juice, at least one fruit juice concentrate, at least one vegetable juice or at least one vegetable juice concentrate.

27. A beverage in accordance with claim 26 wherein said liquid carrier comprises at least one fruit juice or at least one fruit juice concentrate.

28. A beverage in accordance with claim 26 wherein said liquid carrier comprises at least one vegetable juice or at least one vegetable juice concentrate.

* * * * *

UNITED STATES PATENT AND TRADEMARK OFFICE
CERTIFICATE OF CORRECTION

PATENT NO. : 4,988,530

DATED : January 29, 1991

INVENTOR(S) : Kenneth P. Hoersten et al.

It is certified that error appears in the above-identified patent and that said Letters Patent is hereby corrected as shown below:

Column 3, Line 38:

After "juice" delete --o--.

Column 7, following Example 11:

After example, insert --*Blend of juices of celery, carrot, parsley, beet, lettuce, watercress, and spinach, with vinegar and salt added.--

Column 7, following Example 12:

After example, insert --*Blend of juices of celery, carrot, green bell pepper, onion, dill, carrot and parsley, with vinegar and salt added.--

Signed and Sealed this

Twenty-fifth Day of August, 1992

*Attest:*

DOUGLAS B. COMER

*Attesting Officer*     *Acting Commissioner of Patents and Trademarks*